United States Patent [19]
Rasovich

[11] 3,832,864
[45] Sept. 3, 1974

[54] QUICK-FREEZING MACHINE

[76] Inventor: Ivan Rasovich, 1832½ N. Berendo St., Los Angeles, Calif. 90027

[22] Filed: Oct. 13, 1972

[21] Appl. No.: 297,418

[52] U.S. Cl.................... 62/374, 62/380, 198/203
[51] Int. Cl............................................. F25d 17/02
[58] Field of Search.................. 62/63, 4, 374–376, 62/380; 198/203

[56] References Cited
UNITED STATES PATENTS

| | | | |
|---|---|---|---|
| 2,274,284 | 2/1942 | Vore | 62/63 X |
| 2,379,817 | 7/1945 | Mabbs | 62/374 X |
| 2,807,548 | 9/1957 | Morrison | 62/380 X |
| 2,875,888 | 3/1959 | Swain et al. | 198/203 |
| 2,951,353 | 9/1960 | Morrison | 62/375 |
| 3,048,987 | 8/1962 | Wentworth | 62/374 X |
| 3,090,134 | 5/1963 | Morrison | 62/63 X |
| 3,187,514 | 6/1965 | Rendos | 62/375 X |

*Primary Examiner*—Meyer Perlin
*Assistant Examiner*—Ronald C. Capossela
*Attorney, Agent, or Firm*—Harris, Kern, Wallen & Tinsley

[57] ABSTRACT

A quick-freezing machine including an insulated tank containing a liquid bath for quickly freezing items immersed therein. An endless slack conveyor belt is supported between opposite sides of the tank with all but endmost portions thereof fully immersed in the bath. The belt is driven from both of the end portions to maintain the slack in the belt and to fully immerse in the liquid items transported thereby through the bath.

5 Claims, 2 Drawing Figures

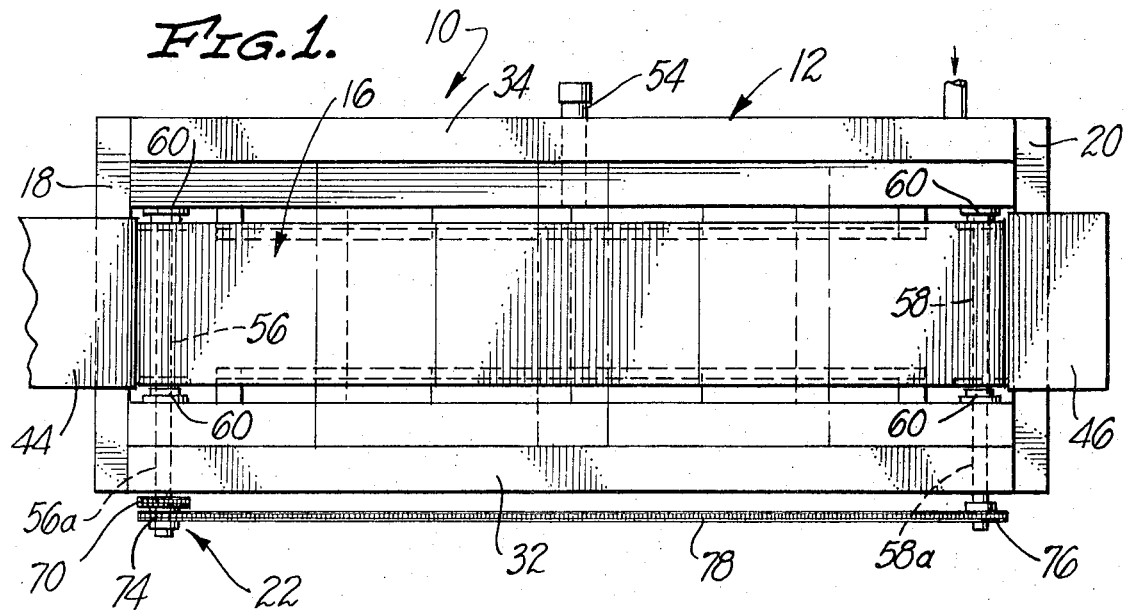
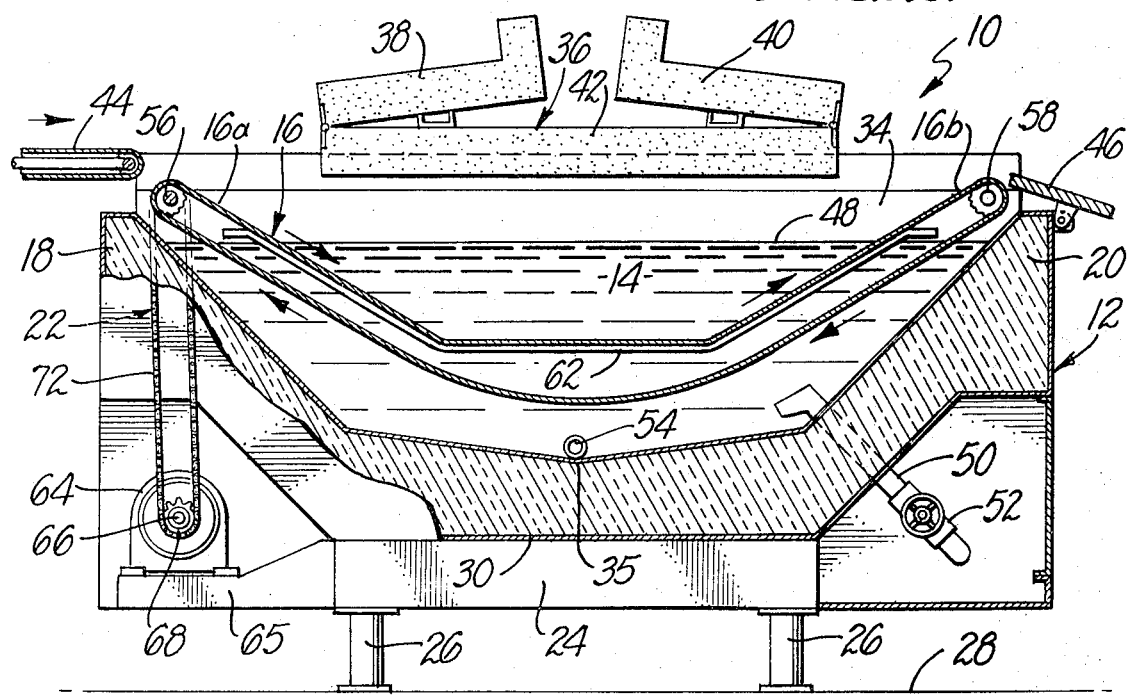

QUICK-FREEZING MACHINE

The present invention relates to freezing apparatus and to a quick-freezing machine particularly useful in the freezing of foods and the like.

In freezing foods and the like, it has been found through years of experience that normally the quicker the foods are frozen the better the resulting quality of the foods. Cryogenic fluids such as liquid nitrogen, carbon dioxide, and others offer an excellent vehicle for quick freezing due to their temperature range from $-100°$ to $-400°F$. Further, freezing with such liquids basically is a simple process. For example, products such as meat and so on may be loaded on a conveyor and either immersed or sprayed with the cryogenic liquid for a longer or shorter time to produce a greater or lesser degree of freezing.

While the basic process of freezing with cryogenic liquids is very simple, in the past, the mechanisms for effecting such freezing have been rather complicated and relatively inefficient. For example, pre and post-cooling stages are often employed prior to immersing the food items in a bath of cryogenic liquid. Further, in the bath, the conveyor belt is supported such that only a relatively small portion thereof is immersed in the liquid to drive the food therethrough. This means that different sections of the belt are continuously and simultaneously being cooled and heated, cooled and heated, and so on. Thus, large quantities of cryogenic liquid are required just to cool the conveyor belt, significantly lowering the efficiency of the freezing operation. Also, during such repeated cooling and heating, the conveyor belt is continuously subjected to stresses and strains which produce undesired wearing of the belt and pose serious mounting and operational problems for the belt.

To overcome the foregoing problems associated with prior cryogenic liquid freezing apparatus, it is an object of the present invention to provide an improved freezing machine in which an endless slack conveyor belt is suspended in a bath with all but endmost portions thereof fully immersed in the liquid.

Another object of the present invention is to provide such a quick-freezing machine wherein the belt is driven from the endmost portions above the liquid to maintain a predetermined amount of slack in the belt and thus avoid design problems and complications in connection with thermal contraction and expansion of the belt.

The foregoing as well as other objects and advantages of the present invention may be more clearly understood by reference to the following detailed description when considered with the drawing which, by way of example only, illustrates one form of quick-freezing machine embodying the features of the present invention.

In the drawing:

FIG. 1 is a top view of the quick-freezing machine; and

FIG. 2 is a side view of the quick-freezing machine partially in section to show the interior of the machine.

Basically, to overcome the problems associated with prior art cryogenic liquid freezing apparatus, the present invention comprises a quick-freezing machine 10 including an insulated tank 12 containing a cryogenic liquid bath 14 for quickly freezing items immersed therein. An endless slack conveyor belt 16 is supported to extend between left and right sides 18 and 20 of the tank with all but endmost portions 16a and 16b of the belt fully immersed in the liquid bath 14. The conveyor belt 16 is driven from the end portions 16a and 16b by drive means 22 to maintain a predetermined amount of slack in the belt whereby items transported by the belt are fully immersed in the cryogenic liquid and frozen thereby in the traveling through the tank from the left and right sides thereof.

Because all but the endmost portions of the conveyor belt 16 are fully immersed in the cryogenic liquid, once the belt is cooled to the temperature of the liquid, a minimum of the liquid is required to maintain the temperature of the belt substantially constant. Further, because the temperature of belt is kept constant, there is no undesired tensioning of the belt as it transports items into and out of the bath. Thus, the efficiency of the machine 10 is significantly higher than prior cryogenic freezers and the conveyor belt 16 included therein possesses a relatively long operating life and is free of the mounting and operational problems which plague prior art cryogenic freezer belts.

More particularly, in the form of the quick-freezing machine 10 illustrated in the drawing, the tank 12 includes a bottom platform 24 having adjustable legs 26 for supporting the tank above a reference plane 28. In this regard, a closed bottom 30 of the tank rests on top of the platform 24 with front and rear walls 32 and 34 and the left and right side wall 18 and 20 extending upwardly therefrom. Preferably, the walls and bottom of the tank 12 are formed of an insulating material covered with a suitable sheet metal. Also, the inner surface of the bottom 30 preferably inclines from a low point 35 at small angles upwardly to the left and right thereof and the inner surface of the left and right side walls 18 and 20 incline upwardly at greater acute angles to a top of the tank. Such a bottom and side configuration follows somewhat the contour of the belt 16 as it is suspended in the tank, eliminates most sharp corners where cleaning is difficult, and reduces to a minimum the amount of cryogenic fluid required for the freezing process.

As illustrated, the top of the tank 12 is normally covered by an insulated top 36 having left and right end portions 38 and 40 hinged to a central portion 42. Thus constructed, the top 36 is adapted to fully close the open top of the tank when the machine is not in use, or to swing to the position illustrated in FIG. 2. In the position shown in FIG. 2, a left top portion of the tank is open to receive items to be frozen from a conveyor belt 44 and to pass the items to the conveyor belt 16. The top right portion of the tank is open to pass the frozen items from the conveyor 16 to a ramp 46 secured to the right side 20 of the tank for transport from the machine.

Preferably, the quick-freezing machine of the present invention includes means for maintaining liquid in the tank at a predetermined level 48. Such means may take various forms and is illustrated in the drawing as including a pipe 50 extending through the right side of the tank. The pipe 50 is adapted for connection to a source of cryogenic liquid (not shown). A valve 52 is also connected to the pipe to regulate the flow of liquid to the tank 12. Mechanical or electromechanical means may be included to operate the valve 52 and various sensors may be employed to actuate such means when the liquid level drops below 48.

In addition to the pipe 50, the tank also includes a drain pipe 54. The drain pipe 54 extends through the back wall 34 and enters the tank just at the low point 35 to provide means for draining all cryogenic liquid when it is desired to clean the tank.

As previously stated, in the present invention, it is important that all but the endmost portions of the conveyor belt 16 be fully immersed in the cryogenic liquid bath 14. Generally speaking, this is accomplished by supporting the conveyor belt 16 only at the end portions thereof and just above the liquid level 48. Further, such support is spaced such that the belt is slack and suspended in the bath between the end portions. Such a slack belt condition is maintained by the drive 22.

More specifically, in the illustrated form of the invention, first and second shafts 56 and 58 laterally support the belt 16 at left and right ends thereof. The shafts 56 and 58 are journalled in bearings 60 at the front and back walls of the tank immediately above the liquid level 48 and adjacent the left and right sides 18 and 20. End portions 56a and 58a of the shafts 56 and 58 extend through the front wall 32 for coupling to the drive 22 as hereinafter described. The bearings 60 supporting the shafts 56 and 58 are spaced from each other relative to the length of the belt 16 such that there is a predetermined amount of slack in the belt as it passes over and extends between the shafts and such that substantially all of the belt is below the liquid level 48 to fully immerse in the liquid items transported thereby. To assist in such transport and to provide vertical support for items traveling through the bath, a guide 62 extends from the front and back walls of the tank 12 immediately below an upper surface of the belt 16.

To insure that substantially all of the belt 16 will continue to be fully immersed in the bath with operation of the machine 10, and to prevent undesired tension forces from developing in the belt, it is important that the predetermined amount of slack be maintained in the belt. To accomplish this, the drive 22 is arranged to turn the shafts 56 and 58 at a common velocity. In this regard, the illustrated form of the drive 22 includes a motor 64 mounted on an extension 65 from the platform 24 and having a drive shaft 66 extending therefrom. On the drive shaft is a sprocket 68. A similar sprocket 70 is on the end portion 56a of the shaft 56 to receive an endless chain 72 extending from and around the sprocket 68. Thus arranged, operation of the motor 64 produces a turning of the shaft 56 with the drive shaft 66. Also mounted on the end portion 56a is a sprocket 74 forward of the sprocket 70. A similar sprocket 76 is mounted on the end portion 58a of the shaft 58. The sprockets 74 and 76 are adapted to receive an endless chain 78 for driving the shaft 58 in the same direction and with the same velocity as the shaft 56. Accordingly, in the drive 22, the shafts 56 and 58 are driven at a common velocity to maintain the predetermined amount of slack in the belt, and to prevent the developing of undesired tensioning of the belt 16 as it travels around the shafts 56 and 58.

While a particular quick-freezing machine has been described in some detail herein, changes and modifications may be made without departing from the spirit of the invention. For example, the motor 64 may be a variable speed motor permitting the speed of the belt 16, product freezing time, and freezing depth to be readily changed and adjusted for different products. In view of this and other changes, it is intended that the present invention be limited in scope only by the terms of the following claims.

I claim:

1. A liquid immersion-type quick-freezing machine comprising:
   an insulated tank containing a liquid bath for quickly freezing items immersed therein;
   an endless slack conveyor belt contained entirely within said tank and supported to extend only between opposite sides of said tank with all but endmost portions of said belt fully immersed in said bath to maintain said belt at a temperature of said bath and to reduce to a minimum all temperature induced expansion and contraction forces in said belt as it travels through said bath; and
   means for simultaneously driving said belt from said endmost portions to insure that substantially all of said belt continues to be fully immersed in said bath upon operation of said machine and to maintain a predetermined amount of slack in said belt to prevent undesired tension forces from developing therein as items transported by said belt are fully immersed in said bath and frozen thereby in traveling through said tank.

2. A quick-freezing machine comprising:
   a tank;
   a liquid filling said tank to a predetermined level for rapidly freezing items immersed therein;
   an endless conveyor belt;
   mounting means for suspending and immersing said belt in said liquid between left and right sides of said tank, including
     first and second shaft means for laterally supporting said belt at opposite end portions thereof, and
     means supporting said first and second shaft means at a front and rear of said tank immediately above said liquid level and adjacent said left and right sides, said supporting means being spaced relative to the length of said belt such that there is a predetermined amount of slack in said belt as it passes over and extends between said shaft means and such that substantially all of said belt is below said liquid level to fully immerse in said liquid items transported thereby between said left and right sides of said tank; and
   drive means for turning said shaft means at a common velocity to maintain said predetermined amount of slack in said belt and to drive said belt through said liquid.

3. The quick-freezing machine of claim 2 wherein said tank includes insulated sides and bottom and a top open only at left and right sides thereof to pass items to be frozen to and from said tank.

4. The quick-freezing machine of claim 2 wherein:
   end portions of said first and second shaft means extend through said front of said tank; and
   said drive means is connected to each of said end portions to rotate said shaft means at said common velocity.

5. The quick-freezing machine of claim 4 wherein said drive means includes:
   a drive motor;
   an endless drive chain between said motor and one of said end portions for turning one of said shaft means at said common velocity; and
   endless chain means between said end portions for turning the other of said shaft means at said common velocity.

* * * * *